April 5, 1927.　　　W. H. SHEARER　　　1,623,891
FASTENER
Filed April 28, 1923
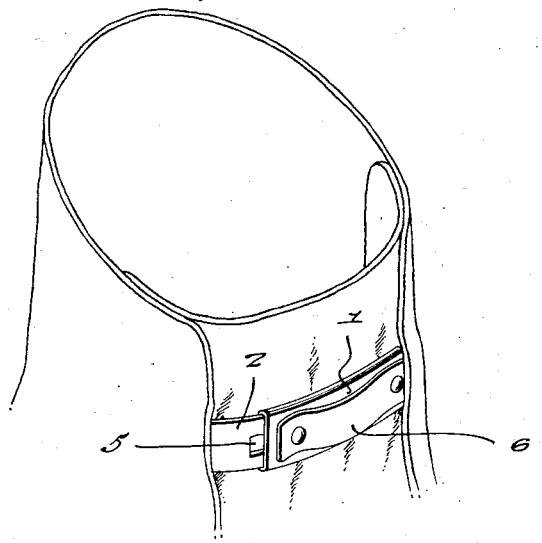
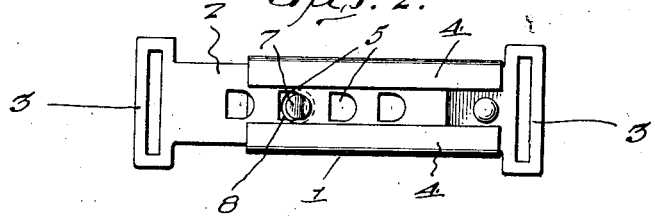
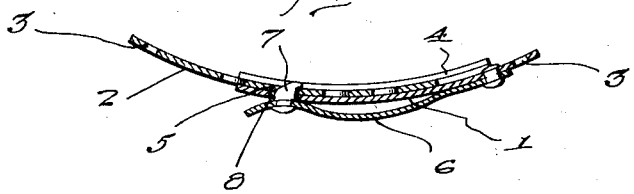
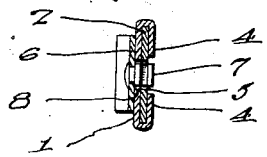
W. H. Shearer
INVENTOR
BY Victor J. Evans
ATTORNEY
WITNESS:

Patented Apr. 5, 1927.

1,623,891

UNITED STATES PATENT OFFICE.

WILLIAM H. SHEARER, OF RAND, COLORADO.

FASTENER.

Application filed April 28, 1923. Serial No. 635,365.

This invention relates to a fastener which is mainly designed for overshoes, coats and the like, the general object of the invention being to provide a fastener which is adjustable and which can be easily and quickly fastened by a sliding movement of one part into another part and which is unfastened by the lifting of a spring latch.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a fragmentary view of a portion of an overshoe showing the invention in use.

Figure 2 is a view of the fastener itself.

Figure 3 is a longitudinal sectional view through the fastener.

Figure 4 is a transverse sectional view.

As shown in these views the fastener comprises the two parts 1 and 2, each part being provided with an elongated eye 3 at its outer end for securing the part to an overshoe or other article. The part 1 is provided with guideways 4 at its sides for receiving the part 2 so that this part 2 slides in the part 1. This part 2 is provided with a plurality of holes 5 each having a rounded front end and a leaf spring 6 on the part 1 carries a beveled projection 7 which passes through a hole 8 in part 1 and is adapted to engage one of the holes in the part 2 for fastening said part 2 in the part 1. It will be noted that the holes 5 are formed with an arcuate wall at one end and with a transverse wall in the other end and that the projection 7 is formed with a rounded part which engages the arcuate wall of each opening so that the same will readily pass from the opening when so desired but the said projection will engage the transverse wall of each opening to form a stop. By beveling the projection the parts can be slid together in one direction without touching the spring as the projection will ride over the metal between the holes but said projection will prevent the withdrawal of member 2 from member 1 in the other direction unless the spring is lifted as the front part of the projection will engage the rounded part of a hole 5, with the lip formed on said projection engaging an under part of member 2.

From the above it will be seen that a simple fastener is provided which will firmly hold the article closed and one which can be easily and quickly fastened together and separated. The parts are so formed that there is no danger of the fastener becoming open on account of the parts thereof catching in things.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A fastener including a pair of members, one having channel guides upon opposite edges thereof to slidably receive the edges of the other member, an elongated eye formed on the outer end of each member, one of said members being formed with a series of openings, an arcuate wall at one end of each opening, a transverse wall at the other end of each opening, a leaf spring carried by the other member and a bevelled projection carried by said leaf spring and projecting through an opening in the member to which it is attached whereby said bevelled projection may be projected into any one of the openings of the other member, a rounded front part on the projection adapted to coact with the arcuate wall of the openings as and for the purpose set forth.

In testimony whereof I affix my signature.

WILLIAM H. SHEARER.